Dec. 13, 1966  L. BRADT ETAL  3,291,070

TOW TRUCK

Filed July 23, 1962  2 Sheets-Sheet 1

INVENTORS:
LYNN BRADT
JOHN G. DORRANCE
BY
ATTORNEY

Dec. 13, 1966  L. BRADT ETAL  3,291,070
TOW TRUCK
Filed July 23, 1962  2 Sheets-Sheet 2
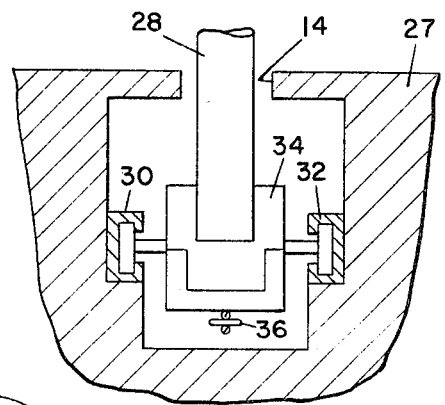
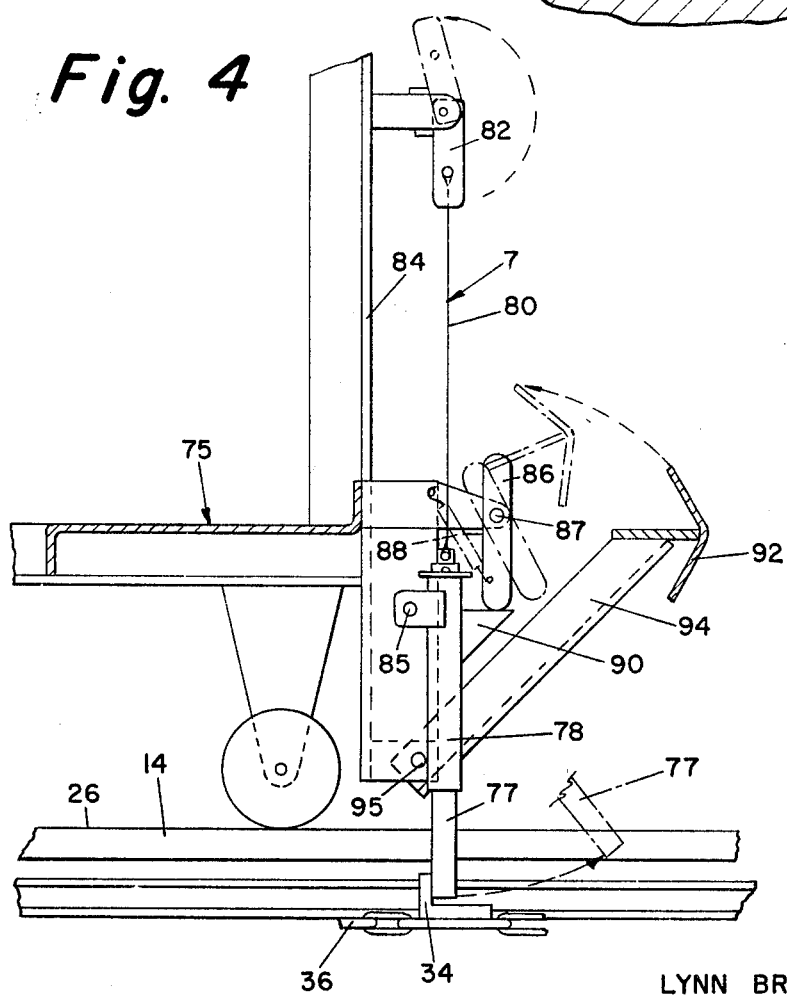
INVENTORS.
LYNN BRADT
JOHN G. DORRANCE
BY
Arthur H. Seidel
ATTORNEY United States Patent Office 3,291,070
Patented Dec. 13, 1966

3,291,070
TOW TRUCK
Lynn Bradt, Easton, Pa., and John G. Dorrance, Phillipsburg, N.J., assignors to S. I. Handling Systems, Inc., Phillipsburg, N.J., a corporation of Pennsylvania
Filed July 23, 1962, Ser. No. 211,772
5 Claims. (Cl. 104—88)

This invention relates to a tow truck of the type adapted to be used in an automatic tow truck dispatching system. The tow trucks are constructed so that they may be caused to accumulate in one area and transfer from a main slot along a shunt slot to another area in a manner which is simple, efficient and effective.

The present invention relates to tow trucks wherein a reciprocally disposed tow pin on a truck has an end portion entering a main slot in a reference surface. The reference surface may be a floor, the uppermost surface on a channel member supported by the floor, a ceiling, etc. A conveyor means is disposed on the opposite side of the surface with respect to the truck. The conveyor means is adapted to cooperate with the tow pin to propel the truck along the main slot.

An accumulation area is provided along the main slot so that all trucks will accumulate in this area until released for movement along the main slot. A pushing area is provided along the main slot at a point spaced from the accumulation area. In the pushing area, each truck will be capable of physically pushing the truck in front thereof notwithstanding the fact that each truck will have been subjected to the same external forces which were applied in the accumulation area. This desirable result is attained in a manner which is simple, efficient and reliable, by merely varying the distance between the conveyor means and the reference surface in the accumulation and pushing areas so that the conveyor means is closer to the reference surface in the pushing area.

In a preferred embodiment of the present invention, a plurality of shunt slots intersect the main slot in the pushing area. A switch device is provided at the intersection of each shunt slot and the main slot to automatically switch a truck from the main slot to a predetermined one of the shunt slots. When only the forward end of a switched truck enters a shunt slot, the next truck propelled along the main slot will physically push the switched truck along its shunt slot. The next truck may be destined for a different shunt slot or may be intended to enter the same shunt slot as the said switched truck.

It is an object of the present invention to provide a novel tow truck.

It is another object of the present invention to provide a novel truck capable of accumulating along a guide track.

It is another object of the present invention to provide a tow truck for use in automatic dispatch system wherein two trucks may accumulate in one area along a main slot and be capable of pushing other trucks in another area along the main slot.

It is another object of the present invention to provide a tow truck for use in automatic dispatch system wherein a tow truck may accumulate or push another truck as a result of the spacing between a conveyor device associated with the tow truck and the reference surface.

It is another object of the present invention to provide a tow truck system which is simple, reliable and capable of automatically dispatching a tow truck along a main slot and into a shunt slot while facilitating accumulation of the tow trucks at a preselected point along the main slot.

Other objects will appear hereinafter.

For the purpose of illustrating the invention there is shown in the drawings forms which are presently preferred; it being understood, however, that this invention is not limited to the precise arrangements and instrumentalities shown.

FIGURE 3 is a transverse sectional view taken within one of the circles along the main slot in FIGURE 1.

FIGURE 4 is a side elevational view, partly in section, of a truck of another embodiment of the present invention.

Referring to the drawing in detail, wherein like numerals indicate like elements, there is shown in FIGURE 1 a tow truck system designated generally as 10.

Figure 1:
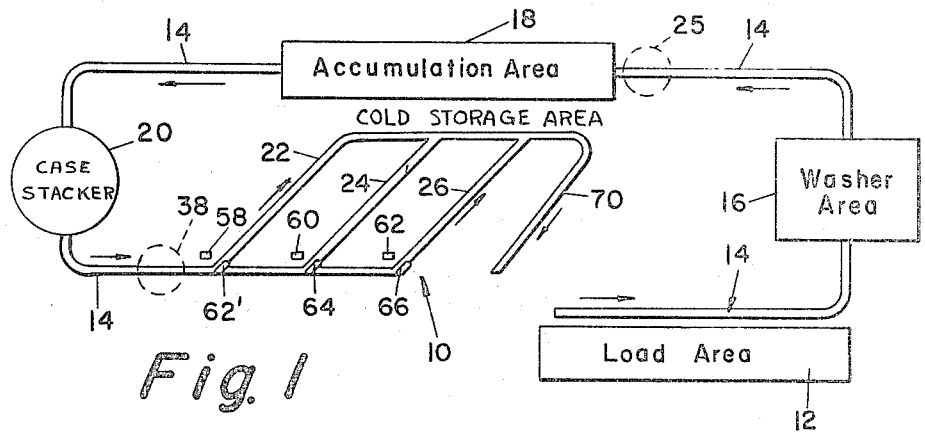
FIGURE 1 is a schematic plan view of a tow truck system with which the tow truck of the present invention may be utilized.

The tow truck system 10 may include a loading area 12 disposed alongside of a portion of a main slot 14. The main slot 14 is provided with a washer area 16. For purposes of illustration, the system 10 is an illustration of a working embodiment of the present invention as installed in a dairy plant. Empty tow trucks will be loaded or positioned over the main slot 14 in the area 12 and be caused to pass through a washer area 16. Thereafter, the tow trucks will pass into an accumulation area 18 disposed along the main slot 14 and spaced from the washer area 16.

When the tow trucks are released from the accumulation area 18, they may pass through a case stacker 20 and be diverted into one of the spur slots 22, 24 or 26 within a cold storage area.

As shown more clearly in FIGURE 3, there is illustrated a transverse sectional view of the main slot 14 in the area within circle 25. A lower end portion of a tow pin 28 will extend through the main slot 14 in a reference surface 27. Reference surface 27, as illustrated, is the floor in a building. A conveyor means is provided below the main slot 14 for propelling the tow pin 28 along the main slot 14. Such conveyor means includes a dog 34 having wheels rotatably supported by and guided by spaced parallel tracks 30 and 32. The dog 34 is propelled along the tracks 30 and 32 by means of a chain 36.

It will be noted that the tracks 30 and 32 are spaced from the reference surface 27 for a distance which results in an overlap of the dog and tow pin 28. Such overlap may be three-quarters of an inch. Hence, if the tow pin 28 is raised vertically for a distance of one inch, the tow pin 28 will lose contact with the dog 34. As a result thereof, tow trucks may accumulate in the area 18.

Figure 2:
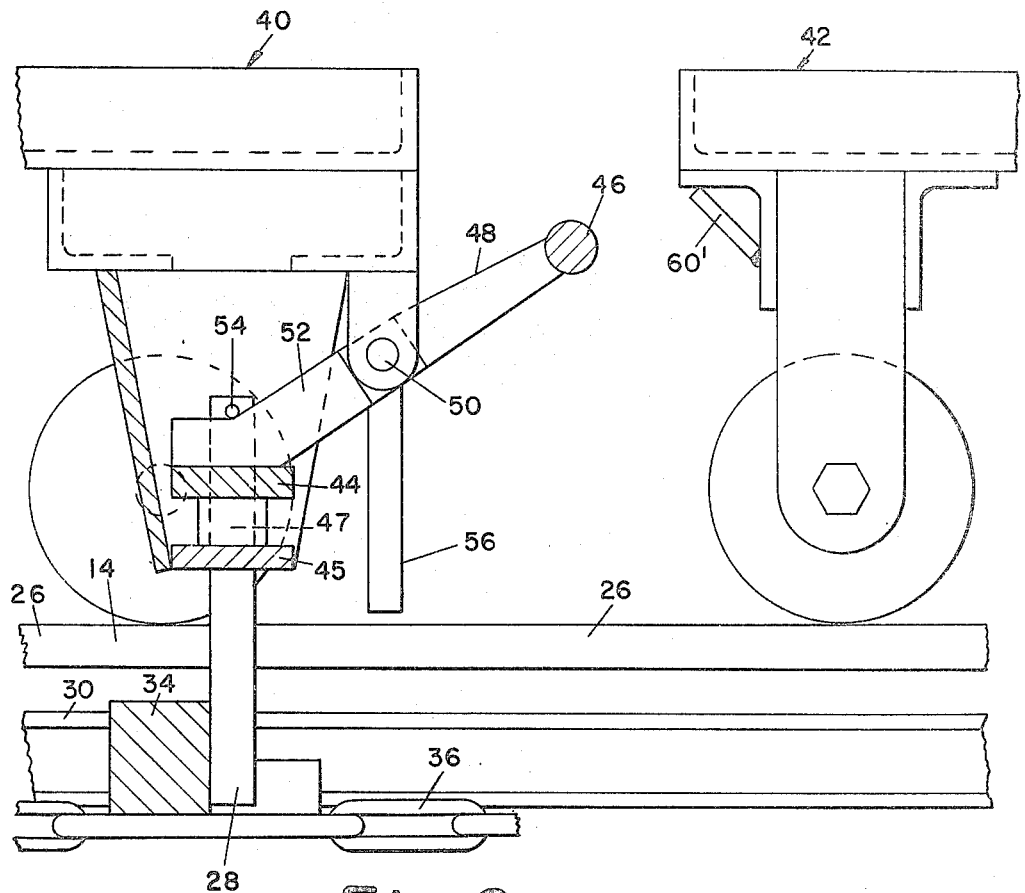
FIGURE 2 is a partial sectional view illustrating two trucks being propelled along a main slot within one of the circles in FIGURE 1.

As shown more clearly in FIGURE 2, tow trucks 40 and 42 are disposed one behind the other along a portion of the main slot 14 within the circle 18 in FIGURE 1. The tow trucks 40 and 42 are identical. Hence, only the front end of truck 40 and the rear end of truck 42 are illustrated. Trucks 40 and 42 may be in the form of flat dollies on which cases of milk bottles and the like may be stacked.

The tow pins 28 are reciprocally supported by the trucks 40 and 42 and guided by spaced guide brackets 44 and 45 having a bushing 47 disposed therebetween. Each of the trucks is provided with a front bumper 46 which may cooperate with the rear of a truck in front for facilitating the reciprocation of the tow pin 28 so that trucks may accumulate in area 18.

Bumper 46 is fixedly interconnected by one or more brackets 48 to a rod 50. Rod 50 is rotatably supported on the truck 40. Rod 50 is provided with one or more lever arms 52 non-rotatably fixed thereon which have their free end overlying bracket 44. A pin 54 extends from the tow pin 28 in a radially outwardly direction and overlies the free end of the lever arms 52.

Each of the trucks are provided with wheels adapted to be in rolling engagement with the reference surface 27. A trip rod 56 is keyed or otherwise associated with the rod 50 in a manner so that trip rod 56 may be moved along rod 50 or be positioned in various locations along rod 50. However, rotation of rod 56 causes rotation of rod 50. The lower end of rod 56 is slightly spaced from the reference surface 27.

The lower end of rod 56 is adapted to cooperate with one of a plurality of abutments on the reference surface 27. An abutment 58 is provided adjacent the intersection of shunt slot 22 and main slot 14. An abutment 60 is provided adjacent the intersection of shunt slot 24 and main slot 14. An abutment 62 is provided adjacent the intersection of shunt slot 26 and main slot 14. Dependent upon the position of the trip rod 56 along the rod 50, the trip rod 56 will cooperate with one of abutments 58, 60 and 62 to cause rotation of the rod 50 thereby resulting in vertical movement of the tow pin 28. The trip rod 56 in each of its positions will be spaced laterally from the tow pin 28 so that it may cooperate with an abutment on the reference surface 27.

Any one of a variety of different devices may be provided to cause the trucks to enter one of the shunt slots 22, 24 or 26. For purposes of illustration, the intersection of the shunt slots with the main slot 14 is controlled by a switch plate. Hence, switch plate 62' controls the intersection of shunt slot 22 and main slot 14. Switch plate 64 controls the intersection of shunt slot 24 and main slot 14. Switch plate 66 controls the intersection of shunt slot 26 and main slot 14.

The switch plates 62'-66 may be of the type illustrated in FIGURES 17 and 18 of Patent No. 2,936,718. Alternatively, the switch plates may be of the type illustrated in FIGURES 4 and 5 of my copending application Serial No. 169,270 filed on January 29, 1962 entitled Tow Truck System and now Patent No. 3,103,895, issued September 17, 1963. In general, the switch plates are provided with two cam surfaces. In the position of the tow pin 28 in FIGURE 2, the tow pin 28 will cooperate with one of the cam surfaces to by-pass the particular shunt slot. If the tow pin 28 has been raised a specific distance, it will cooperate with a second cam surface which causes the tow pin to be directed into the particular shunt slot.

The operation of the apparatus 10 is as follows:

Empty tow trucks will be positioned over the main slot 14 in the load area 12. The next dog on the continuously moving chain 36 will contact the lower end of the tow pin 28 and propel the tow truck along the main slot 14 through the washer area 16 to the accumulation area 18. In the accumulation area 18, the bumper 46 will contact an angled plate 60' on the rear of the next truck in front of it, such as truck 42. Such contact between bumper 46 and plate 60' causes bumper 46, bracket arms 48, rod 50 and lever arms 52 to rotate in a clockwise direction as seen in FIGURE 2. Such rotation causes the tow pin 28 to move in a vertical direction for a sufficient distance so as to cause the tow pin 28 to lose contact with its dog 34. While the tow truck is within the accumulation area 18, the elements will remain in the above described position.

Upon release from the accumulation area 18, the elements will immediately assume the position illustrated in FIGURE 2. Hence, the next dog on the chain 36 will contact the lower end of the tow pin 28 and propel the truck to the case stacker 20. At the case stacker 20, trip rod 56 will contact an abutment to cause rotation of rod 50 in a clockwise direction thereby resulting in movement of the tow pin 28 as described above. As soon as the truck has been stacked with cases of milk, trip rod 56 will be caused to lose contact with the abutment and tow pin 28 will be lowered to a position whereby it may be contacted by the next dog on the chain 36. At this point, the trip rod 56 may be positioned so as to cause the truck to enter a predetermined one of the shunt slots 22, 24 or 26. As the dog propels the tow pin 28 along the main slot 14 from the case stacker 20 toward the cold storage area, the tracks 30 and 32 become closer to the reference surface 27 as may be evidenced by a comparison of FIGURES 2 and 3. The raising of the plane of the tracks 30 and 32 increases the "bite" between the dog 34 and the lower end of the tow pin 28. For purposes of illustration, let it be assumed that the "bite" is one and one-half inches. Hence, it will be seen that the tow pin 28 will remain in contact with the dog 34 when the tow pin 28 has been raised a vertical distance of one inch in response to rotation of rod 50.

None of the shunt slots 22, 24 or 26 are provided with a conveyor means therebelow. Let it be assumed that the trip rod 56 on each of the trucks 40 and 42 were positioned so that these trucks would enter the shunt slot 22. This may be accomplished by positioning the trip rod 56 so that it contacts abutment 58. When trip rod 56 on truck 42 contacted abutment 58, the lower end of tow pin 28 was raised for a sufficient distance so that it would contact a cam surface on switch plate 62' thereby directing the tow pin 28 into shunt slot 22. The momentum of tow truck 42 is insufficient to cause the entire truck to move along the shunt slot 22. Hence, the rear end portion of truck 42 will obstruct the path of the next truck therebehind.

When the trip rod 56 on tow truck 40 contacts abutment 58, the lower end of tow pin 28 will be raised for a sufficient distance so that it will be directed into shunt slot 22 by the switch plate 62'. However, the spacing of the conveyor means with respect to the reference surface 27 results in the tow pin 28 remaining in contact with the dog 34 with a bite of approximately one-half inch. Hence, the bumper 46 will contact plate 60' and push the truck 42 further along the shunt slot 22 so as to make room for the truck 40. Thereafter, the truck 40 will enter the shunt slot 22 and its rear end portion will be obstructing the path of the next truck being propelled along the main slot 14.

It is to be noted that rotation of the bumper 46 in the accumulation area 18 resulted in the accumulation of trucks since such rotation was sufficient to cause the tow pin 28 to lose contact with the conveyor means. However, in the pushing area along the intersection of the shunt slots and the main slot, such rotation of the bumper 46 was insufficient to cause the tow pin 28 to lose contact with the conveyor means. Hence, the bumper 46 has been converted from an accumulation bumper to a pushing bumper merely by varying the distance between the reference surface 27 and the conveyor means in the accumulation area and the pushing area. Thus, the conversion of the function of the bumper 46 has been accomplished in a manner which is simple, reliable and efficient.

If the next truck being propelled along the main slot 14 has been adjusted so that it is intended to enter shunt slot 24, it will push the tow truck 40 further along the shunt slot 22 thereby clearing the path along the main slot 14. As the tow pins 28 are cammed into one of the selected shunt slots 22, 24 or 26, the tow pin slides laterally across the front face of the dog 34. While only three shunt slots are illustrated, it will be appreciated that a greater number of shunt slots will be provided as desired. The end of the shunt slots may be interconnected with a second main slot 70 which facilitates removal of the trucks from the cold storage area.

In FIGURE 4, there is disclosed a truck 75 being propelled along main slot 14 by a dog 34. Truck 75 has a tow pin 77 extending through and reciprocally guided by housing 78. The lower end of pin 77 extends into main slot 14. A cable 80 is secured at one end to the tow pin 77 and at its other end to latch 82.

Latch 82 is pivotably supported by wall structure 84 on truck 75 for movement between the solid line and phantom positions in response to manual actuation. Housing 78 is pivotably supported by wall structure 84 at pin 85 for movement between the solid line and phantom positions.

Housing 78 is maintained in the solid line position by a latch 86 pivotably supported by wall structure 84 for rotation about pin 87. Latch 86 is biased to its solid line position by spring 88. In its solid line position, latch 86 overlies bracket 90 on housing 78 thereby preventing housing 78 from rotating in a counterclockwise direction.

An accumulation bumper 92 is supported from the wall structure 84 by bracket arms 94 (only one arm is illustrated). Arms 94 are adapted to pivot about pin 95 in a counterclockwise direction when bumper 92 contacts an obstruction. When bumper 92 pivots to its phantom position, it rotates latch 86 to its phantom position. In its phantom position, latch 86 no longer overlies bracket 90. Hence, the dog 34 will not propel truck 75, but will merely pivot tow pin 77 and housing 78 to the phantom position. As soon as dog 34 passes tow pin 77, the tow pin will again resume its solid line position until it is pivoted by the next dog. When bumper 92 resumes its solid line position due to the removal of the obstruction, the latch 86 will resume its solid position thereby preventing pivotal movement of tow pin 77. Hence, the next dog contacting tow pin 77 will propel the truck 75 along slot 14.

The truck 75 may be used in system 10 and will accumulate in area 18. The amount of pivotable movement of housing 78 may be limited by contact with a limit stop supported by wall structure 84 or latch 86, if desired.

The above description as pertains to utilization of the present invention in a milk plant is for purposes of illustration only. The particular novel arrangement of the present invention may be utilized in any one of a wide variety of systems where it is desired to have an accumulation area and a pushing area with a bumper facilitating accumulation in the accumulation area and pushing in the pushing area effected by varying the distance between a conveyor means and a reference surface.

The present invention may be embodied in other specific forms without departing from the spirit or essential attributes thereof and, accordingly, reference should be made to the appended claims, rather than to the foregoing specification as indicating the scope of the invention.

It is claimed:

1. A tow truck comprising a truck body having wheel means, a tow pin guide on said body, a tow pin reciprocably supported by said guide, the lower end of said tow pin projecting downwardly for entry into a slot in a reference surface, means supporting said guide and pin for pivotal movement with respect to a horizontal axis transverse of said body, a latch means opposing said pivotal movement, a bumper, means supporting said bumper on said body for movement between first and second positions, and said bumper and latch means being oriented so that movement of said bumper to said second position prevents said latch means from opposing pivotal movement of said tow pin and its guide.

2. A truck in accordance with claim 1 wherein said tow pin is vertically disposed and gravity biased to its lowermost position, and a flexible member supporting said tow pin from a point on said body thereabove.

3. A truck in accordance with claim 1 wherein said latch means includes a latch, said latch overlying a portion of said guide, and means supporting said latch on said body for movement to a position wherein said latch does not obstruct the pivotable path of said guide.

4. A truck in accordance with claim 3 wherein said bumper is pivotably supported by said body, and said latch being positioned in the path of pivotable movement of said bumper for contact therewith at said second position of said bumper.

5. A tow truck comprising a truck body having wheel means, a tow pin guide on said body, a tow pin supported by said guide for movement in an upright direction, the lower end of said tow pin projecting downwardly for entry into a slot in a reference surface, means on said body supporting said guide and pin for pivotable movement about an axis extending transversely across the body, a bumper, means supporting said bumper on said body for movement about a horizontal axis extending transversely across the body, said bumper having first and second positions, means opposing pivotable movement of said guide and tow pin, said bumper and said opposing means being orientated so that movement of said bumper to said second position prevents said opposing means from opposing pivotable movement of said guide and tow pin.

References Cited by the Examiner
UNITED STATES PATENTS

| | | | |
|---|---|---|---|
| 2,619,370 | 11/1952 | Leger | 104—172 XR |
| 2,640,580 | 6/1953 | DeBurgh | 198—33 |
| 2,885,969 | 5/1959 | Kay et al. | 104—172 |
| 2,936,718 | 5/1960 | Bradt et al. | 104—172 |
| 3,015,284 | 1/1962 | Klamp | 104—172 |
| 3,045,610 | 7/1962 | Klamp | 104—172 X |

ARTHUR L. LA POINT, *Primary Examiner.*

LEO QUACKENBUSH, *Examiner.*

F. W. MONAGHAN, S. B. GREEN, *Assistant Examiners.*